(12) United States Patent
Kinugasa et al.

(10) Patent No.: US 8,337,079 B2
(45) Date of Patent: Dec. 25, 2012

(54) FLUORESCENT TEMPERATURE SENSOR

(75) Inventors: Seiichiro Kinugasa, Tokyo (JP);
Atsushi Kato, Tokyo (JP); Shunji Ichida, Tokyo (JP)

(73) Assignee: Azbil Corporation, Tokyo (JP)

(*) Notice: Subject to any disclaimer, the term of this patent is extended or adjusted under 35 U.S.C. 154(b) by 631 days.

(21) Appl. No.: 12/469,800

(22) Filed: May 21, 2009

(65) Prior Publication Data

US 2009/0296770 A1    Dec. 3, 2009

(30) Foreign Application Priority Data

May 27, 2008  (JP) ................. 2008-138300

(51) Int. Cl.
| | |
|---|---|
| G01K 11/00 | (2006.01) |
| G01N 17/00 | (2006.01) |
| G01N 25/58 | (2006.01) |
| G01N 15/00 | (2006.01) |
| G01J 5/08  | (2006.01) |

(52) U.S. Cl. .............. 374/4; 374/57; 374/161; 374/131; 374/102; 374/124

(58) Field of Classification Search .................. 374/120, 374/121, 130–132, 161–162, 4, 57, 45, 102, 374/100, 129, 1; 356/43; 385/12, 115
See application file for complete search history.

(56) References Cited

U.S. PATENT DOCUMENTS

| | | | | |
|---|---|---|---|---|
| 4,061,578 A | * | 12/1977 | Kleinerman ................. 250/330 |
| 4,376,890 A | * | 3/1983 | Engstrom et al. ........ 250/227.23 |
| 4,689,483 A | * | 8/1987 | Weinberger ............. 250/227.23 |
| 4,703,175 A | * | 10/1987 | Salour et al. .................... 356/45 |
| 4,749,856 A | * | 6/1988 | Walker et al. ............ 250/227.11 |
| 4,906,107 A | * | 3/1990 | Luukkala ........................ 374/161 |
| 4,979,133 A | * | 12/1990 | Arima et al. .................. 702/134 |
| 5,112,137 A | * | 5/1992 | Wickersheim et al. ....... 374/131 |
| 5,183,338 A | * | 2/1993 | Wickersheim et al. ....... 374/131 |
| 5,255,980 A | * | 10/1993 | Thomas et al. ............... 374/161 |
| 5,272,340 A | * | 12/1993 | Anbar .......................... 250/332 |
| 5,729,012 A | * | 3/1998 | Wood et al. ............ 250/227.15 |
| 5,965,877 A | * | 10/1999 | Wood et al. ............ 250/227.15 |
| 6,168,311 B1 | * | 1/2001 | Xiao et al. ...................... 374/161 |
| 7,507,022 B2 | * | 3/2009 | Bird ................................ 374/161 |
| 7,744,275 B2 | * | 6/2010 | Kawauchi et al. ............ 374/131 |
| 7,762,720 B1 | * | 7/2010 | Zhu et al. ....................... 374/131 |
| 2007/0223556 A1 | * | 9/2007 | Lee et al. ........................... 374/1 |
| 2009/0041404 A1 | * | 2/2009 | Stoddart ........................... 385/12 |
| 2009/0262331 A1 | * | 10/2009 | Burchardt et al. .............. 356/32 |
| 2011/0128990 A1 | * | 6/2011 | Wu et al. ........................ 374/161 |
| 2011/0170823 A1 | * | 7/2011 | Xia et al. ......................... 385/12 |

FOREIGN PATENT DOCUMENTS

JP    2002-071473 A    3/2002

* cited by examiner

*Primary Examiner* — Gail Verbitsky
(74) *Attorney, Agent, or Firm* — Troutman Sanders LLP

(57) ABSTRACT

To provide a fluorescent temperature sensor capable of identifying easily the location of a failure. A fluorescent temperature sensor for producing a temperature signal from fluorescent light from a fluorescent material and that has been optically stimulated comprises a light projecting module having an LED for projecting light at the fluorescent material and a second photodiode for receiving light emitted from the LED and a light receiving module having a first photodiode for receiving the light emitted from the fluorescent material, where the location of a failure in the sensor can be identified based on, at least, the output signal from the second photodiode.

5 Claims, 6 Drawing Sheets

FLUORESCENT TEMPERATURE SENSOR

CROSS REFERENCE TO PRIOR APPLICATIONS

The present application claims priority under U.S.C. §119 to Japanese Patent Application No. 2008-138300, filed May 27, 2008. The content of the application is incorporated herein by reference in its entirety.

TECHNICAL FIELD

The present invention relates to a fluorescent temperature sensor for producing a temperature signal from fluorescent light of a fluorescent material that is optically stimulated

BACKGROUND OF THE INVENTION

As illustrated in Japanese Unexamined Patent Application Publication 2002-71473, there is a fluorescent temperature sensor of this type provided with a fluorescent material, a light projecting element for projecting light at the fluorescent material, a light receiving element for receiving light from the fluorescent material, an optical branching device (a half mirror), and a calculating/controlling unit.

In this fluorescent temperature sensor, light from the light projecting element passes through the optical branching device to be projected at the fluorescent material. The light from the fluorescent material that is optically stimulated thereby is reflected by the light branching device to a light receiving element side. The temperature of the temperature measurement environment wherein the fluorescent material exists is calculated and outputted by the calculating/controlling unit based on the changes in the optical flux (the brightness) from the fluorescent material, detected by the light receiving element, or in other words, based on the attenuation characteristics of the fluorescent light.

Here the individual components such as the light projecting element, the fluorescent material, and the light receiving element, and the module that is structured including these components, will degrade it over time due to use, and the functionality thereof will eventually come to an end.

However, in the conventional fluorescent temperature sensor, when there is a failure due to the degradation of the individual elements, or the like, the identification of the location of the failure is difficult. That is, it is necessary to disassemble the sensor and check the operation of several different modules and components individually in order to identify the location of the failure, and thus there is a problem in that the identification of the location of a failure is laborious and time-consuming.

In contemplation of the situation set forth above, the object of the present invention is to provide a fluorescent temperature sensor wherein a the location of a failure can be identified easily.

SUMMARY OF THE INVENTION

The fluorescent temperature sensor as set forth in a first invention is a fluorescent temperature sensor for producing a temperature signal from fluorescent light of a fluorescent material that has been optically stimulated, including a light projecting module having a light projecting element for projecting light at the fluorescent material and an auxiliary light receiving element for receiving light that is emitted by the light projecting element; a light conveying medium for conveying light between the light projecting module and the fluorescent material; a light receiving module having a light receiving element for receiving light emitted from the fluorescent material; a signal processing circuit for generating a temperature signal from the output of the light receiving element; a light conveying medium for the received light between the light receiving module and the fluorescent material; and identifying means for identifying the location of a failure in the sensor based on, at least, the output signal from the auxiliary light receiving element.

Given the fluorescent temperature sensor as set forth, while the light projecting element is illuminated, that light is monitored by the auxiliary light receiving element that is housed within the light projecting module. Additionally, after the light projecting element is turned OFF, the light from the fluorescent material is illuminated onto the auxiliary light receiving element through the optical fiber for the projected light, and thus the light that is emitted from the fluorescent material is also monitored by the auxiliary light receiving element. Because of this, it is possible to identify with ease which of the locations, such as the light projecting element or the fluorescent material is the location of a failure, such as a failure in light emission, through the output signal from the auxiliary light receiving element or a combination of that output signal with another signal or a detected value.

The fluorescent temperature sensor as set forth above, wherein: the identifying means identify the location of the failure in the sensor based on the output signal of the auxiliary light receiving element and the output signal of the light receiving element.

Given the fluorescent temperature sensor as set forth, while the light projecting element is illuminated, the light is monitored by the light receiving element through the light conveying medium for the projected light and the light conveying medium for the received light. Additionally, after the light projecting element has been turned OFF, the light from the fluorescent material is illuminated onto the light receiving element through the optical fiber for the received light, and thus the light that is emitted from the fluorescent material is monitored by the light receiving element. Given this, it is possible to identify, easily and reliably, the element, that is, the light projecting element, the fluorescent material, the light receiving element, or the auxiliary light receiving element, in which a failure has occurred, through a combination of the output signal of the light receiving element and the output signal of the auxiliary light receiving element.

The fluorescent temperature sensor as set forth above, wherein: the identifying means identify the location of a failure in at least the light projecting module based on the output signal of the light receiving element and the output signal of the auxiliary light receiving element relative to the light that is emitted by the light projecting element.

Given that fluorescent temperature sensor, light is received by the auxiliary light receiving element and the light receiving element while the light projecting element emits light. Given this, the location of a failure in, at least, the light projecting module can be identified based on the output signal of the light receiving element and the auxiliary light receiving element. This makes it possible to identify a problem or a failure in the auxiliary light receiving element when there is an aberrant value in the output signal of the auxiliary light receiving element regardless of whether or not the output signal from the light receiving element is a proper value. Additionally, this enables the identification of a failure, or the like, in the light projecting element when there is an aberrant value in the output signal of either the light receiving element or the auxiliary light receiving element.

The fluorescent temperature sensor as set forth below is the fluorescent temperature sensor as set forth in any of the above inventions, wherein the identifying means identify the location of a failure in the light receiving module, or one or more failures in the fluorescent material, the light conveying medium for the projected light, or the light conveying medium for the received light, based on the output signal of the light receiving element and the output signal of the auxiliary light receiving element relative to the light emitted by the fluorescent material.

Given the fluorescent temperature sensor, the light of the fluorescent material after the light projecting element has been turned OFF is received by the auxiliary light receiving element and the light receiving element. Given this, the location of the failure in the light receiving module or in one or more locations in the fluorescent material, the light conveying medium for the projected light, and/or the light projecting medium for the received light is identified based on the output signals from the auxiliary light receiving element and the light receiving element. This makes it possible to identify a failure in the light receiving module when the output signal from the auxiliary light receiving element is the proper value when the output signal from the light receiving element indicates an aberrant value, for example, and possible to identify a failure, or the like, in the fluorescent material, or the like, when there is an aberrant value in the output signal of the auxiliary light receiving element as well.

DETAILED DESCRIPTION OF THE INVENTION

A fluorescent temperature sensor will be explained as an of embodiment according to the present invention, in reference to FIG. 1 through FIG. 6.

Figure 1:
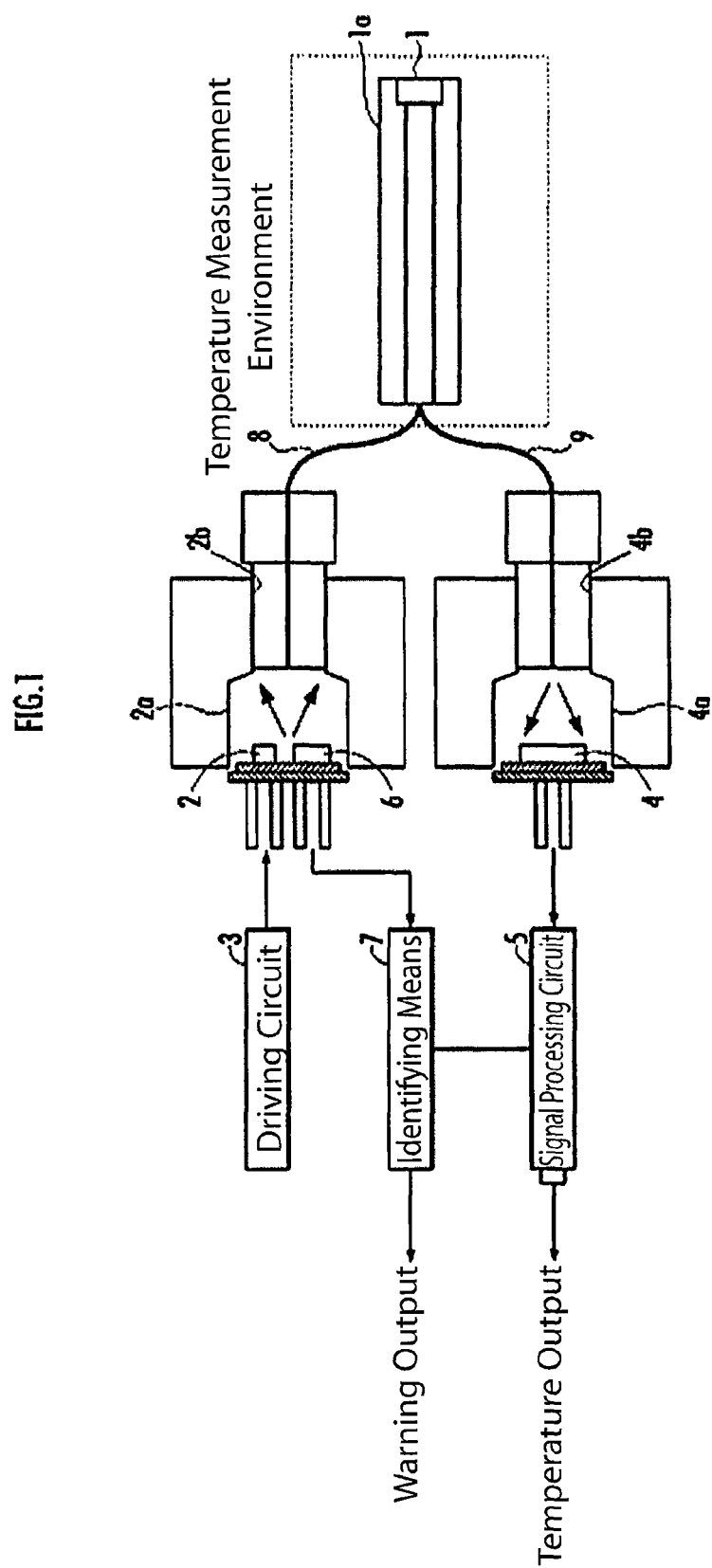
FIG. 1 is an overall structural diagram of the fluorescent temperature sensor according to the present invention.

The overall structure of the fluorescent temperature sensor according to the present example of embodiment will be explained in reference to FIG. 1. The fluorescent temperature sensor includes a fluorescent material 1 that exhibits fluorescent characteristics that vary with temperature; an LED 2, as the light projecting element for projecting light to the fluorescent material 1; a driving circuit 3 for driving the LED 2; a signal processing circuit 5 for generating and outputting a temperature signal in accordance with the output signal from a first photodiode 4, as the light receiving element that receives the light that is emitted from the fluorescent material 1; a second photodiode 6 (corresponding to the auxiliary light receiving element in the present invention) for receiving that directly the light that is emitted from the LED 2; and identifying means 7 for identifying the location of a failure in the sensor.

Additionally, the fluorescent temperature sensor is also provided with an optical fiber for projected light to convey the light from the LED 2 to the fluorescent material 1, and an optical fiber 9 for the received light, to convey the fluorescent light from the fluorescent material 1 to the first photodiode 4.

Note that an external power supply, not shown, is connected to the signal processing circuit 5, where the electric power required for the operation of the sensor is supplied from the external power supply.

The fluorescent material 1 is disposed so as to face the core portions of the optical fibers 8 and 9, in guard sheathes 1a that are provided so as to cover the end portions of the optical fibers 8 and 9 for the projected light and the received light.

The LED 2 is a light-emitting diode that has, as the emitted light color, a blue-spectrum wavelength, for example, and is disposed within a light projecting module 2a. The light projecting module 2a has a connector portion 2b to which the fiber 8 for the projected light connects, where the optical fiber 8 for the projected light, connected through this connector portion 2b, faces the light emitting portion 20 of the LED 2. (See FIG. 2.)

The driving circuit 3 applies, to the LED 2, a pulse electric current that is limited, by the control circuit, to the illumination time and magnitude of the driving current required for the LED 2 to emit light. For example, the driving circuit 3 applies, to the LED 2, a pulse current of a specific magnitude to cause the light emission time of the LED 2, in a single measurement, to be somewhere between 1 ms and 500 ms, in accordance with the fluorescent material 1.

The first photodiode 4 is disposed within a light receiving module 4a to measure the optical flux (the brightness) of the light that is emitted. The light receiving module 4a has a connector 4b for connecting the optical fiber 9 for the received light, where the optical fiber 9 for the received light, connected through the connector 4b, faces the light receiving portion of the first photodiode 4.

The signal processing circuit 5 measures the attenuation characteristics of the fluorescent light of the fluorescent material 1 using the first photodiode 4, and in particular, measures the fluorescent relaxation time. Specifically, the signal processing circuit 5 calculates and outputs the temperature of the temperature measurement ambient environment wherein the fluorescent material 1 exists, based on the temperature dependency of a correspondence relationship (including a data table, a map, or the like) between the fluorescent light relaxation time and the fluorescent material 1, established in advance.

The second photodiode 6 is disposed in parallel with the LED 2 in the light projecting module 2a, to measure the optical flux (the brightness) of the light that is illuminated onto the light receiving portion 60 thereof. (See FIG. 2.) Note that the disposition of the second photodiode 6 in the light projecting module 2a will be described below.

The identifying means 7 are made from a circuit that identifies the failure location within the sensor from the timing of the light emission from the LED 2 and the output signals from the first photodiode 4 and the second photodiode 6. Note that the process for identifying the failure locations by the identifying means 7 will be described below.

A specific structure for the light projecting module 2a will be explained next in reference to FIG. 2.

In the light projecting module 2a, an LED 2 and a second photodiode 6 are disposed on a substrate 21 with a specific gap there between. A base portion 22 abuts the outer portion of the substrate 21, and a plurality of terminal electrodes 23 are provided passing through the substrate 21 and the base portion 22. Additionally, terminal electrodes 23 are connected either directly or through lead lines 24 to the LED 2 or the second photodiode 6.

In the light projecting module 2a, a casing 25 is provided so as to cover over the substrate 21, including the LED 2 and the second photodiode 6, from the base portion 22, where a window portion 26, which is plugged with quartz glass, is formed in the ceiling portion of the casing 25.

The positional relationship between the LED 2, the second photodiode 6, and the optical fiber 8 for the projected light will be explained next.

When the optical fiber 8 for the projected light is connected through the connector portion 2b, the light receiving portion 60 of the second photodiode 6 and the light emitting portion 20 of the LED 2 are disposed facing the core portion 8a of the optical fiber 8. Specifically, the core portion 8a of the optical fiber 8 is positioned within the range of the directional characteristics 20a of the LED 2, and the light receiving portion 40 of the second photodiode 6 is disposed so as to be positioned within the range of the aperture angle .theta. that is defined by the core portion of the optical fiber 8.

Note although the explanation is omitted in the drawings, the same is true for the disposition of the first photodiode 4 within the light receiving module 4a, which is disposed so that the light receiving portion of the first photodiode 4 will be positioned within the range of the aperture angle that is defined by the core portion of the optical fiber 9 for the received light.

Figure 3:
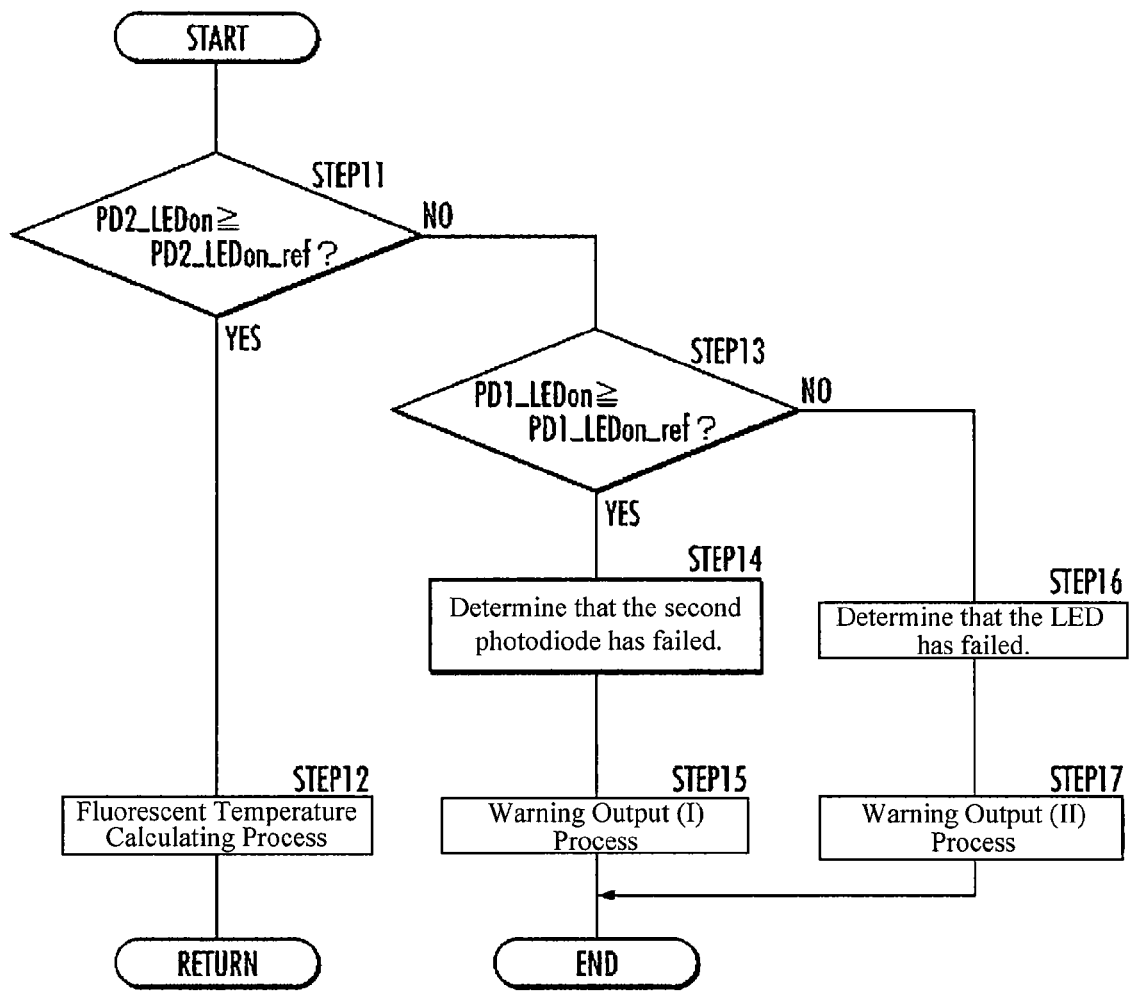
FIG. 3 is a flowchart illustrating a process for identifying the location of the failure in the light projecting module.
Figure 4:
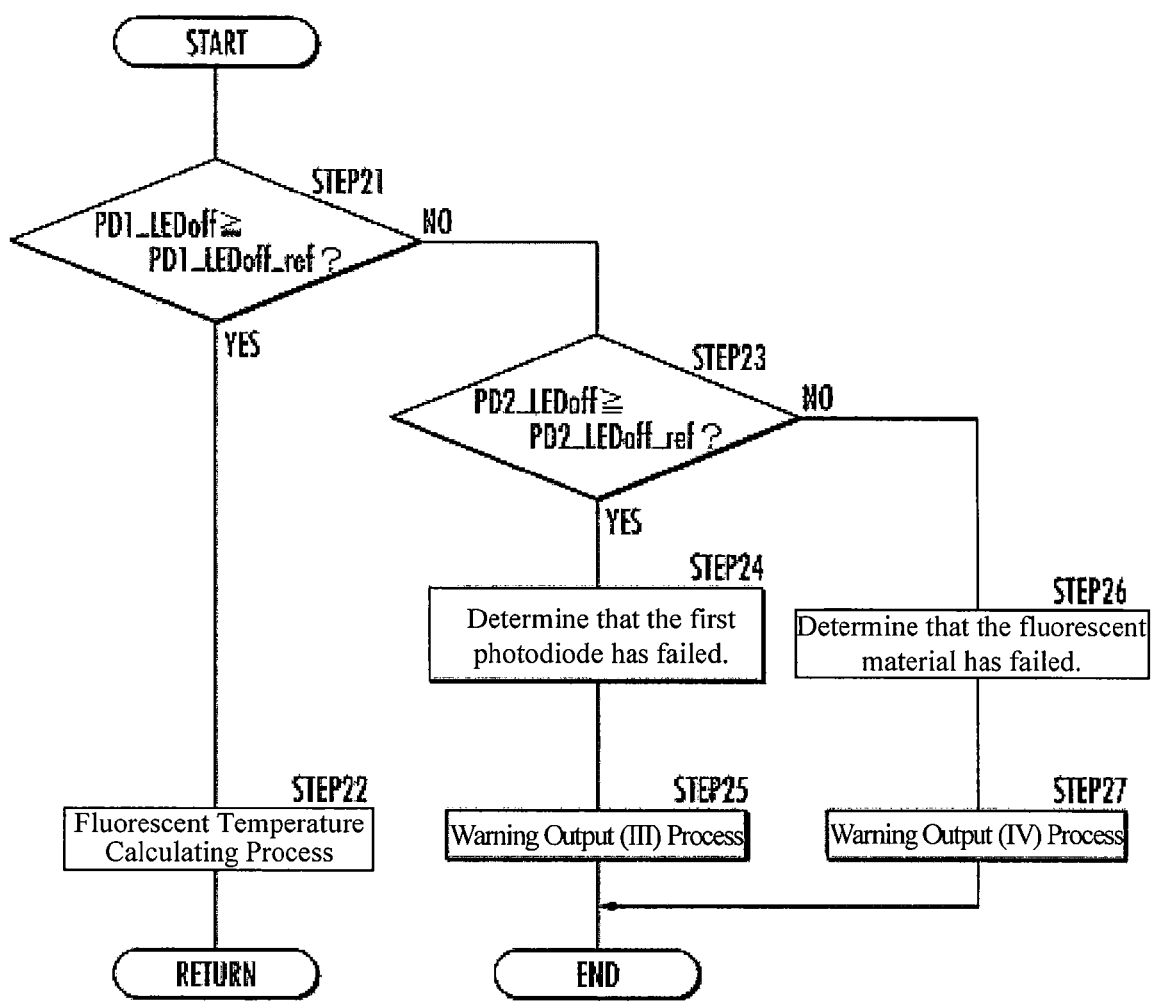
FIG. 4 is a flowchart illustrating a process for identifying the location of the failure in the fluorescent material and the light receiving module.
Figure 5:
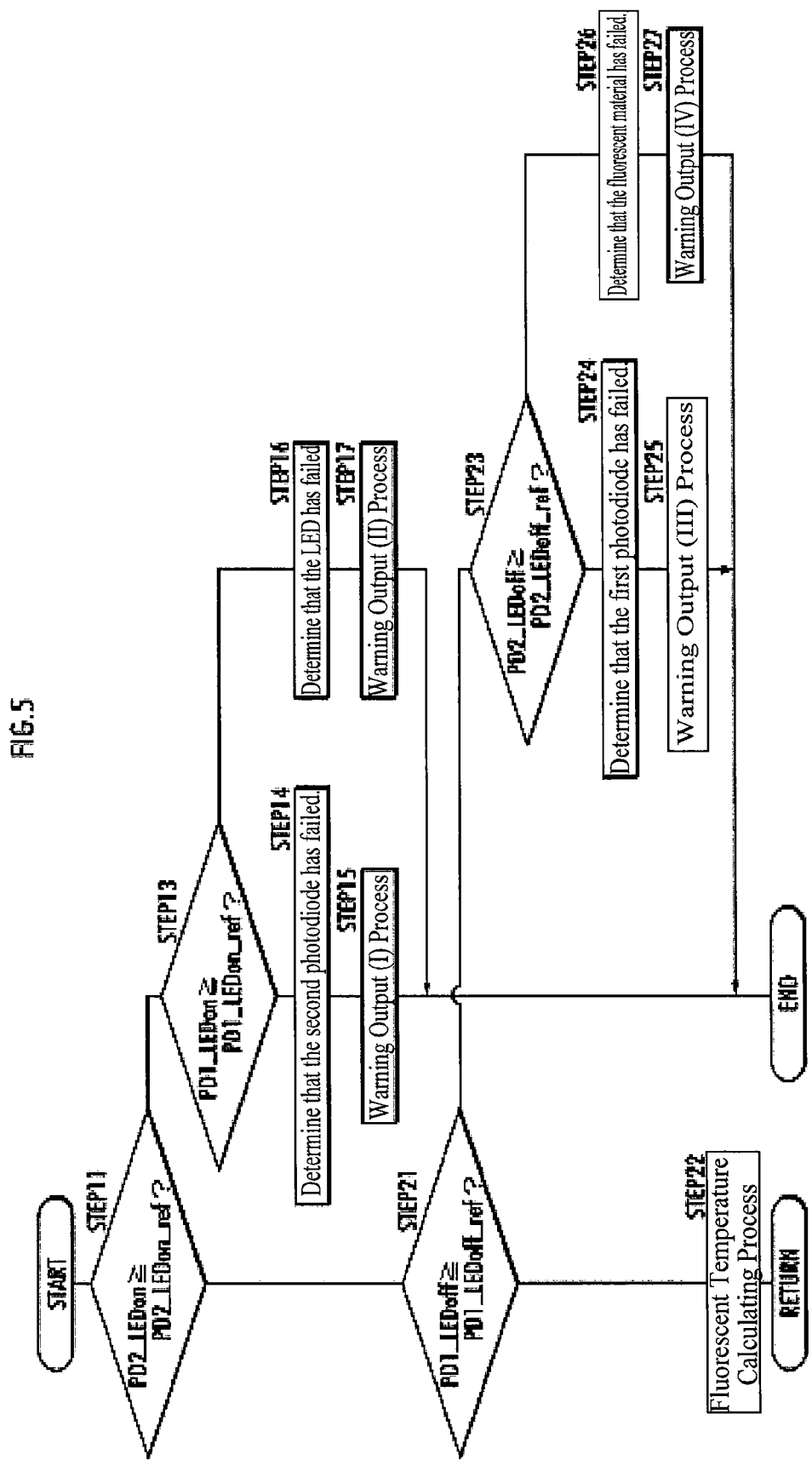
FIG. 5 is a flowchart illustrating the process for specifying the location of the failure, combining FIG. 3 and FIG. 4.

The process for identifying the location of the failure, by the identifying means 7, will be explained next in reference to the flow charts illustrated in FIG. 3 through FIG. 5.

First, when adjusting the fluorescent temperature sensor at the shipping stage so that the light projecting intensity of the LED 2 is a desirable light projecting intensity, the output signal PD1_LEDon_ref of the first photodiode 4 and the output signal PD2_LEDon_ref of the second photodiode 6 when the LED 2 is illuminated, and the output signal PD1_LEDoff_ref of the first photodiode 4 and the output signal PD2_LEDoff_ref of the second photodiode 6 immediately after the LED 2 is turned OFF are stored in an internal memory, not shown. Note that the output signal PD1_LEDoff_ref of the first photodiode 4 and the output signal PD2_LEDoff_ref of the second photodiode 6 immediately after the LED 2 is turned OFF are that which is outputted after the fluorescent light intensity (the initial light emission intensity) of the fluorescent material 1 is measured.

The identifying means 7 use the output signal PD1_LEDon_ref of the first photodiode 4 and the output signal PD2_LEDon_ref of the second photodiode 6 when the LED 2 is illuminated, and the output signal PD1_LEDoff_ref of the first photodiode 4 and the output signal PD2_LEDoff_ref of the second photodiode 6 immediately after the LED 2 is turned OFF, which are stored in the internal memory as the respective threshold values, to identify the locations of failures in the sensor as described below.

First the process for identifying the location of the failure in the light projecting module 2a from the output signal PD1_LEDon of the first photodiode 4 and the output signal PD2_LEDon of the second photodiode 6 when the LED 2 is illuminated will be explained in reference to FIG. 3.

The identifying means 7 obtain the output signal PD2_LEDon of the second photodiode 6, while the LED 2 is illuminated, and evaluates whether or not the output signal PD2_LEDon of the second photodiode 6 obtained is at least as large as the threshold value corresponding thereto (Step 11). Here the threshold value is the output signal PD2_LEDon_ref of the second photodiode 6 while the LED 2 is illuminated, stored in the internal memory. However, in consideration of fluctuations in the light-emission intensity of the LED 2, a value wherein a predetermined value has been subtracted from the output signal PD2_LEDon_ref may be used.

Furthermore, if the output signal PD2_LEDon of the second photodiode 6 is at least as great as the threshold value (Step 11: Yes), then the measurement is continued, and the fluorescent temperature is calculated (Step 12). Specifically, the optical flux of the fluorescent light of the fluorescent material 1 immediately after the LED 2 is turned OFF is acquired by the first photodiode 4, and the fluorescent light relaxation time is calculated from the attenuation characteristics thereof, and the temperature of the temperature measuring environment wherein the fluorescent material 1 exists is calculated from a correlation equation (including a data table, a map, or the like) between the temperature characteristics of the fluorescent light relaxation time and the fluorescent material 1. Then the calculated temperature is outputted through an output terminal or interface, or the like, not shown.

On the other hand, if the output signal PD2_LEDon of the second photodiode 6 is less than the threshold value (Step 11: No), then the identifying means 7 obtain the output signal PD1_LEDon of the first photodiode 4 while the LED 2 is illuminated, and evaluates whether or not the obtained output signal PD1_LEDon of the first photodiode 4 is at least as large as a threshold value related thereto (Step 13). Here the threshold value is the output signal PD1_LEDon_ref of the first photodiode 4 while the LED 2 is illuminated, stored in the internal memory However, in consideration of fluctuations in the light-emission intensity of the LED 1, a value wherein a predetermined value has been subtracted from the output signal PD1_LEDon_ref may be used.

If the output signal PD1_LEDon of the first photodiode 4 is at least as great as the threshold value (Step 13: Yes), or in other words, if, notwithstanding the fact that the LED 2 has been identified by the first photodiode 4 as emitting light properly, the second photodiode 6 does not detect this light, then the identifying means 7 determine that there is a failure in the second photodiode 6 (Step 14), and output a warning to that effect (Step 15). As this warning output, a display or a warning sound corresponding to the failure of the second photodiode 6 may be outputted from a warning lamp or a speaker, not shown. Additionally, a signal providing notification of the failure of the second photodiode 6 may be outputted to a machine (for example, a computer) that is connected to the fluorescent temperature sensor, and there may be a display of the failure of the second photodiode 6 on the display portion of this machine.

On the other hand, if the output signal PD1_LEDon of the first photodiode 4 is less than the threshold value, (Step 13: No), that is, if the LED 2 is not seen as emitting light properly by both the first photodiode 4 and the second photodiode 6, then the identifying means 7 determine that it is the LED 2 that has failed (Step 16) and issue a warning to that effect (Step 17). As this warning output, a display or a warning sound corresponding to the failure of the LED2 may be outputted from a warning lamp or a speaker, not shown. Additionally, a signal providing notification of the failure of the LED 2 may be outputted to a machine (for example, a computer) that is connected to the fluorescent temperature sensor, and there may be a display of the failure of the LED 2 on the display portion of this machine.

Additionally, if it has been determined that there is a failure in either the second photodiode 6 or the LED 2 (Step 14, 16), then, along with outputting the aforementioned warning, the measurement is terminated, and the series of processes is ended.

Doing so enables the identification of, at least, whether the failure is of the LED 2 or the second photodiode 6 in the light projecting module 2a based on the output signals from the first photodiode 4 and the second photodiode 6 while the LED 2 is illuminated.

Note that while in the present embodiment, the measurement was terminated by the failure of the second photodiode 6, conversely the fluorescent temperature may continue to be calculated by performing measurements for a predetermined period of time even after the detection of the failure of the second photodiode 6. The second photodiode 6 is that which identifies the location of the failure, and even if the measurement were to be continued, there would be no direct impact on the measurement. Additionally, when determining which of the components has the failure, whether to the structure so as to perform only the outputting of the warning and/or the termination of the measurements, or whether to convey to the user the results of the determination of the failure through some other means, can be determined as appropriate by a person skilled in the art to determine the structure.

The process for determining the location of the failure in the fluorescent material 1 and the light receiving module 4a from the output signal PD1_LEDoff_ref of the first photodiode 4 and the output signal PD2_LEDoff_ref of the second photodiode 6 immediately after the LED 2 is turned OFF will be explained next in reference to FIG. 4.

The identifying means 7 acquired the output signal PD1_LEDoff_ref of the first photodiode 4 immediately after the LED 2 is turned OFF, and evaluate whether or not the acquired output signal PD1_LEDoff_ref of the first photodiode 4 is at least as great as the threshold value related thereto (Step 21). Here the threshold value is the output signal PD1_LEDoff_ref of the first photodiode 4 immediately after the LED 2 is turned OFF, stored in the internal memory. However, in consideration of fluctuations in the initial light-emission intensity of the fluorescent materials 1, a value wherein a predetermined value has been subtracted from the output signal PD1_LEDoff_ref may be used.

Furthermore, if the output signal PD1_LEDoff of the first photodiode 4 is at least as great as the threshold value (Step 21: Yes), then the measurement is continued, and the fluorescent temperature is calculated (Step 22). Note that the measurement process for the fluorescent temperature Step 22 is identical to the process in Step 21, so the explanation is omitted here.

On the other hand, if the output signal PD1_LEDoff of the first photodiode 4 is less than the threshold value (Step 21: No), then the identifying means 7 obtain the output signal PD2_LEDoff of the second photodiode 6 immediately after the LED 2 is turned OFF, and evaluates whether or not the obtained output signal PD2_LEDoff of the second photodiode 6 is at least as large as a threshold value related thereto (Step 23). Here the threshold value is the output signal PD2_LEDoff_ref of the second photodiode 6 immediately after the LED 2 is turned OFF, stored in the internal memory. However, in consideration of fluctuations in the initial light-emission intensity of the fluorescent materials 1, a value wherein a predetermined value has been subtracted from the output signal PD2_LEDoff_ref may be used.

If the output signal PD2_LEDoff of the second photodiode 6 is at least as great as the threshold value (Step 23: Yes), or in other words, if, notwithstanding the fact that the LED 2 has been identified by the second photodiode 6 as emitting light properly, the first photodiode 4 does not detect this light, then the identifying means 7 determine that there is a failure in the first photodiode 4 (Step 24), and output a warning to that effect (Step 25). The structure may be such that a display or a warning sound corresponding to the failure of the first photodiode 4 may be outputted from a warning lamp or a speaker, not shown, as this warning output. Additionally, a signal providing notification of the failure of the first photodiode 4 may be outputted to a machine (for example, a computer) that is connected to the fluorescent temperature sensor, and there may be a display of the failure of the first photodiode 4 on the display portion of this machine.

On the other hand, if the output signal PD2_LEDoff of the second photodiode 6 is less than the threshold value, (Step 23: No), that is, if the LED 2 is not seen as emitting light properly by both the first photodiode 4 and the second photodiode 6, then the identifying means 7 determine that there is a failure in India the fluorescent materials 1 or the optical fibers 8 or 9 (Step 26) and issue a warning to that effect (Step 27). As this warning output, a display or a warning sound corresponding to the failure of the fluorescent material 1, etc., may be outputted from a warning lamp or a speaker, not shown. Additionally, a signal providing notification of the failure of the fluorescent material 1, etc., may be outputted to a machine (for example, a computer) that is connected to the fluorescent temperature sensor, and there may be a display of the failure of the fluorescent material 1, etc., on the display portion of this machine.

Additionally, if it has been determined that there is a failure in either the first photodiode 4 or the fluorescent material 1, etc. (Step 24, 26), then the measurement is terminated, and the series of processes is ended.

Doing so enables the identification there is a failure of either the first photodiode 4 or the fluorescent material 1, etc., in the light receiving module 4a and the fluorescent material 1, etc., based on the output signals from the first photodiode 4 and the second photodiode 6 relative to the initial light emission intensity of the fluorescent material 1 immediately after the LED 2 is turned OFF.

The process for identifying the location of the failure in the fluorescent temperature sensor from the output signal PD1_LEDon and PD1_LEDoff of the first photodiode 4 and the output signal PD2_LEDon and PD2_LEDoff of the second photodiode 6 when the LED 2 is illuminated and immediately after the LED 2 is turned OFF will be explained next in reference to the flow chart shown in FIG. 5. Note that the processes in the flow chart in FIG. 5 combine the processes in the flow charts in FIG. 3 and FIG. 4, and identical codes are provided, and explanations are omitted, for those processes that are identical to those in FIG. 3 and FIG. 4.

In the present example of embodiment, if the evaluation result in Step 11 is Yes (that is, when there is no failure in the light projecting module 2a), then the identifying means 7 perform the identification of the location of the failure in the fluorescent materials 1 Additionally, if the evaluation result in Step 21 is Yes (that there is no failure in either location), then the measurement is continued, and the fluorescent temperature is calculated (Step 22).

This not only enables the easy and reliable identification of the location of the failure in the fluorescent temperature sensor, but also enables the achievement of stabilized temperature measurements, because the measurements are performed conditionally on there being no locations wherein there are failures.

Note that while in the present example of embodiment the location of the failure in the light projecting module 2a is identified from the combination of the output signal PD1_LEDon of the first photodiode 4 and the output signal PD2_LEDon of the second photodiode 6 when the LED 2 is illuminated, and the location of the failure in the fluorescent material 1 and the light receiving module 4a is identified from the combination of the output signal PD1_LEDoff of the first photodiode 4 and the output signal PD2_LEDoff of the second photodiode 6 immediately after the LED 2 is turned OFF, the combinations are not limited thereto.

For example, a failure in either the LED 2 or the second photodiode 6 can be identified by a combination of the output signal PD2_LEDon of the second photodiode 6 when the LED 2 is illuminated and the output signal PD1_LEDoff of the first photodiode 4 immediately after the LED 2 is turned OFF.

In this case, if the output signal PD1_LEDoff of the first photodiode 4 immediately after the LED 2 is turned OFF is greater than the threshold value PD1_LEDoff_ref, corresponding thereto, notwithstanding the output signal PD2_LEDon of the second photodiode 6 when the LED 2 is illuminated being smaller than the threshold value PD2_LEDon_ref, corresponding thereto (PD2_LEDon<PD2_LEDon_ref and PD1_LEDoff.gtoreq.PD1_LEDoff_ref), then the identifying means 7 can identify the second photodiode 6 as the location of the failure.

Figure 2:
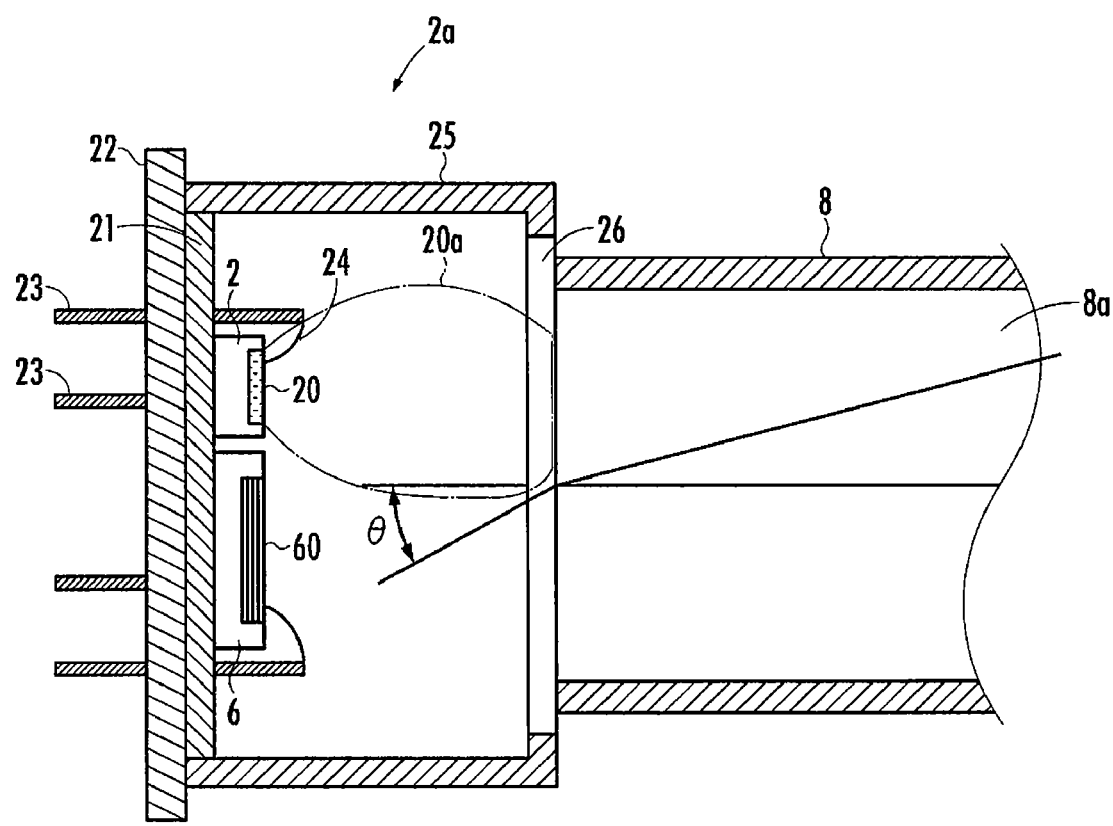
FIG. 2 is an explanatory diagram illustrating a specific structure for the light projecting module.
Figure 6:
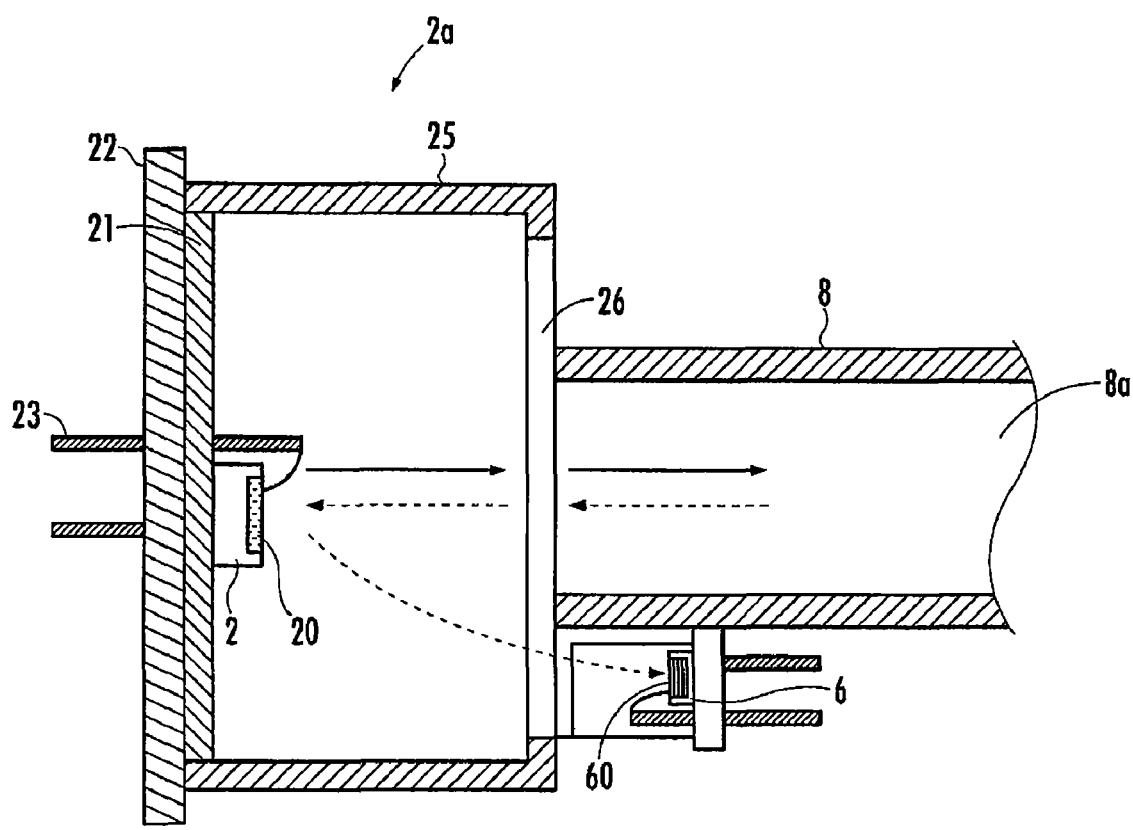
FIG. 6 is an explanatory diagram illustrating a modified example of the light projecting module illustrated in FIG. 2.

Additionally, if the output signal PD1_LEDoff of the first photodiode 4 immediately after the LED 2 is turned OFF is less than the threshold value PD1_LEDoff_ref, corresponding thereto, when the output signal PD2_LEDon of the second photodiode 6 when the LED 2 is illuminated is less than the threshold value PD2_LEDon_ref, corresponding thereto (PD2_LEDon<PD2_LEDon_ref and PD1_LEDoff<PD1_LEDoff_ref), then the identifying means 7 can identify the LED 2 as the location of the failure Additionally, the disposition of the LED 2 and the second photodiode 6 in the light projecting module 2a is not limited to the case of being disposed in parallel on the substrate 21, as illustrated in FIG. 2. For example, as illustrated in FIG. 6, the second photodiode 6 may be disposed in a position that is facing the LED 2. In this case, the second photodiode 6 is disposed in parallel with the optical fiber 8 for the projected light, and the light of the LED 2 may illuminate the light receiving portion 60 of the second photodiode 6 directly through the window portion 26. On the other hand, the light of the fluorescent materials 1 immediately after the LED 2 has been turned OFF will be reflected from the mirrored surface that is formed on the surface of the LED or on the surface of the substrate 21, as illustrated by the dotted line, where that reflected light will illuminate the light receiving portion 60 of the second photodiode 6. Doing so enables the specification of the location of the failure in the fluorescent temperature sensor in the same manner as in the example of embodiment set forth above, even though the disposition of the second photodiode 6 within the light projecting module 2a has been changed.

The invention claimed is:

1. A fluorescent temperature sensor for producing a temperature signal from fluorescent light of a fluorescent material that has been optically stimulated, comprising:

a light projecting module having a light projecting element projecting light at the fluorescent material and an auxiliary light receiving element receiving light that is emitted by the light projecting element;

a light conveying medium conveying light between the light projecting module and the fluorescent material;

a light receiving module having a light receiving element receiving light emitted from the fluorescent material;

a signal processing circuit generating a temperature signal from an output signal of the light receiving element;

a second light conveying medium between the light receiving module and the fluorescent material; and an identifying unit identifying a location of a failure in the sensor based on both an output signal of the auxiliary light receiving element and the output signal of the light receiving element.

2. The fluorescent temperature sensor as set forth in claim 1, wherein the identifying unit comprises a memory including:

a light receiving element off reference value;

a light receiving element on reference value;

an auxiliary light receiving element off reference value; and an auxiliary light receiving element on reference value;

wherein the identifying unit locates the failure in the sensor by comparing at least one of the light receiving element off reference value and the light receiving element on reference value to the output signal of the light receiving element; and comparing at least one of the auxiliary light receiving element off reference value and the auxiliary light receiving element on reference value to the output signal of the auxiliary light receiving element.

3. The fluorescent temperature sensor as set forth in claim 2, wherein the identifying unit compares the auxiliary light receiving element on reference value to the output signal of the auxiliary light receiving element and compares the light receiving element on reference value to the output signal of the light receiving element to determine if one of the auxiliary light receiving element or the light projecting element has failed.

4. The fluorescent temperature sensor as set forth in claim 2, wherein the identifying unit compares the auxiliary light receiving element off reference value to the output signal of the auxiliary light receiving element and compares the light receiving element off reference value to the output signal of the light receiving element to determine if one of the light receiving element or the fluorescent material has failed.

5. The fluorescent temperature sensor as set forth in claim 3, wherein the identifying unit compares the auxiliary light receiving element off reference value to the output signal of the auxiliary light receiving element and compares the light receiving element off reference value to the output signal of the light receiving element to determine if one of the light receiving element or the fluorescent material has failed.

* * * * *